United States Patent Office 3,197,443
Patented July 27, 1965

3,197,443
THERMALLY STABLE POLYAMIDES FROM SYMMETRICALLY SUBSTITUTED AROMATIC DIAMINES
Donald C. Pease, Wilmington, Del., assignor to E. I. du Pont de Nemours and Company, Wilmington, Del., a corporation of Delaware
No Drawing. Filed July 13, 1960, Ser. No. 42,490
3 Claims. (Cl. 260—78)

This invention relates to new and useful synthetic polymers. More specifically, it relates to a novel group of nitrogen-containing condensation polymers which exhibit enhanced melting points, and which may be formed into shaped structures of great utility.

Nitrogen-containing condensation polymers have been known for many years, and several members of this class of polymers have achieved wide commercial significance and have been manufactured on a large scale. Of these polymers, the polyamides have been most widely exploited and most completely described in the patent art. Polyamides prepared from aliphatic diamines and dicarboxylic acids, from aromatic diamines and dicarboxylic acids, from aliphatic-aromatic diamines and dicarboxylic acids, and from mixtures of these types, have been prepared and described. Shaped articles prepared from these polymers possess excellent physical characteristics for most end uses. For some end uses, however, the melting point and thermal stability of the particular polyamide is undesirably low.

A novel class of polyamides has now been discovered, characterized by melting points and thermal stability higher than other comparable polymers. The high melting polyamide of this invention is characterized by recurring units having the structural formula:

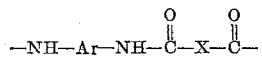

wherein Ar comprises a divalent aromatic nucleus which bears one or more symmetrically placed substituents whose point of attachment to the aromatic nucleus is ortho to the amido nitrogen atoms, said substituents being non-reactive under condensation polymerization conditions, or a mixture of divalent radicals, of which at least about 70% are of the type described above; and X is a divalent radical such that the two carboxylic carbon atoms are joined either to one another or to aliphatic carbon atoms. Thus, X represents a carbon-to-carbon bond; a methylene group, ethylene group, or other straight, branched-chain, or cyclic aliphatic divalent radical; a radical of the following type:

—CH₂—Y—CH₂— wherein Y represents an aliphatic-aromatic divalent radical, or an aromatic divalent radical; or mixtures of such radicals. Sufficient units are present to provide film- and fiber-forming polymers.

More specifically, Ar is a divalent radical having one of the following structural formulae:

(a) 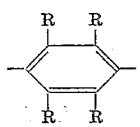

(b) 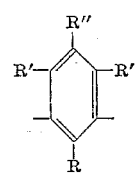

(c) 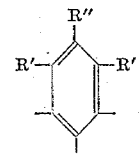

(d) 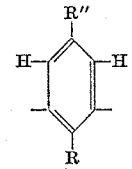

wherein R and R' are lower alkyl, halogen, or other simple substituent which is not reactive under conditions of condensation, and R'' is a hydrogen atom, lower alkyl, halogen or other non-reactive substituent.

It is thus apparent that the organic radicals which are designated as Ar above possess aromatic nuclei, i.e., of the meta- or para-phenylene radical, to which are bonded nuclear substituents. For example, when a para-phenylene radical is incorporated, all ortho-positions, and hence all nuclear positions, are occupied by groups other than hydrogen. When a meta-phenylene radical is incorporated, there will necessarily be present one, two, or three substituents symmetrically placed relative to the amido-groups and ortho- to each of them as, for example, one substituent located between the amido-groups; two substituents, each ortho- to only one of the amido-groups; or three substituents, one ortho- to each of the amido-groups and one located between them and ortho- to both. There may also be present, when the radical is of the meta-phenylene type, one additional substituent meta- to both of the amido-groups, but this substituent is not necessary and imparts no additional enhancement to the melting point.

The desired thermal characteristics are obtained when the nuclear substituents are symmetrically placed relative to the amido-groups. By this is meant that the aromatic nucleus must be so substituted that a line normal to the polymeric chain through the nucleus divides the divalent radical into similar halves. This may be further explained with reference to structure diagrams (1) and (2), below:

(1) 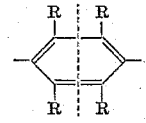

(2) 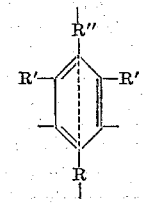

For symmetry in (1), it is necessary that there be four nuclear substituents, having similar spatial requirements, so that the two halves of the divalent radical will be similar. The only requirement for symmetry in (2) is that both groups designated as R' be of the same type, i.e., whether both positions are occupied by hydrogen atoms or by substituents other than hydrogen, the spatial requirements of the two groups must be similar. Regardless of the nature of R and R", the radical may be symmetrical, inasmuch as these two groups lie on the line through the nucleus normal to the polymeric chain; but if one nuclear substituent designated as R' differs appreciably from the other in spatial requirements, symmetry is not possible.

The polyamides of this invention may be prepared by the reaction of diamines of the type described herein with dicarboxylic acids or their derivatives, wherein the carboxylate groups are bonded to aliphatic carbon atoms.

Exemplary diamines which may be utilized in this invention are: 2-methyl-m-phenylenediamine; 4,6-dimethyl-m-phenylenediamine; 2,4,6-trimethyl-m-phenylenediamine; 2,4,5,6-tetramethyl-m-phenylenediamine; and 2,3,5,6-tetramethyl-p-phenylenediamine. One or more of the positions occupied by methyl groups may be substituted by other simple substituents which are not reactive under conditions of condensation, as for example, other lower alkyl groups such as ethyl, isopropyl, etc. Exemplary of the compounds of this type which are within the scope of this invention are: 2-ethyl-m-phenylenediamine; 4,6-diisopropyl-m-phenylenediamine; 2,4,6-triethyl-m-phenylenediamine; 2,5-dimethyl-4,6-diethyl-m-phenylenediamine; 2,3,5,6-tetraethyl-p-phenylenediamine; and other similarly substituted members of the above classes. One or more of the methyl groups may also be substituted in a similar manner with halogen groups as chloro-, bromo-, iodo-, or fluoro-, such as 2-bromo-m-phenylenediamine.

Other types of substituents which may replace one or more of the methyl groups in the above listing of operable diamines are lower alkoxy groups as methoxy, ethoxy, etc.; nitro groups; nitrile groups; or any other simple substituent which is not reactive under the conditions of condensation.

Dicarboxylic acids of the aliphatic or aliphatic-aromatic types, or their derivatives, may be reacted with the diamines described herein to form the polyamides. Suitable aliphatic dicarboxylic acids include oxalic acid, malonic acid, succinic acid, adipic acid, glutaric acid, pimelic acid, suberic acid, azelaic acid, sebacic acid, and other higher members of this series. Exemplary aliphatic-aromatic dicarboxylic acids which are of utility in the preparation of the polyamides of this invention include m-phenylenediacetic acid, p-phenylenediacetic acid, m-benzenedipropionic acid, p-benzenedipropionic acid, and other higher members of the class of meta- or para-benzenealkyl dicarboxylic acids. The useful derivatives of these acids include the acid halides, esters, and amides.

Any conventional method may be utilized in the preparation of the high melting polyamides of this invention. For example, these polyamides may be prepared by melt polymerization. In accordance with this process, the various monomeric substances are mixed together, and the mixture is maintained at an elevated temperature for an extended period of time, frequently under reduced pressure for at least a portion of the reaction time, in order to effect polymerization.

By one embodiment of this process, polyamides are prepared by initially mixing together the dicarboxylic acid and the diamine, separating the resulting salt, and carrying out the polymerization by melting the salt. This has the advantage of guaranteeing the presence in the polymerizing mixture of equimolecular quantities of the monomeric substances. In any case, however, the monomeric materials are polymerized by maintaining them at an elevated temperature, generally above 200° C. for an extended period of time, ranging from about one hour upwards, until the desired degree of polymerization is attained.

A second procedure which has been employed for the preparation of these polyamides is interfacial polymerization. By this method, the monomeric substances must be in separate phases which are immiscible with one another and which are combined with rapid stirring to insure thorough mixing. The polymerization reaction takes place at the interfaces between the phases. This method generally involves no elevated temperatures, and may be carried out at room temperature or below. The monomeric substances must be capable of rapid reaction if the polymerization is to proceed.

Other methods which have been employed in the preparation of polymers of these types, as, for example, solution polymerization, may be used with equal success in the preparation of the polymers of this invention. All of the polymers described in the examples are capable of film formation, so that polymers of comparable molecular weight are compared where melting point comparisons are given.

*Example I*

Triethyl amine, in the amount of 11.12 grams, and 4,6-dimethyl-m-phenylenediamine, in the amount of 6.88 grams, are dissolved in 225 ml. of chloroform, and the solution is placed in a Waring Blendor. While stirring the above amine solution, a solution of 11.95 grams of sebacyl chloride in 100 ml. of chloroform is added rapidly. Triethyl amine, in this and similar examples which follow, serves as an acid acceptor, neutralizing the hydrogen chloride produced by the reaction of the amino functions with acid chloride groups. The reaction mixture becomes turbid almost immediately, and stirring is continued for 5 minutes. Upon addition of 150 ml. of water, the mixture becomes thick and not readily stirrable. Hexane (600 ml.) is added for coagulation of the polymeric product, which is separated by filtration, washed, and dried. The resulting poly(4,6-dimethyl-m-phenylene sebacamide) melts at a temperature of 271° C. This is 42° higher than the melting point of the corresponding polyamide which bears no nuclear substituents, i.e., poly(m-phenylene sebacamide).

The same polymer may be prepared by a melt polymerization. In a reaction tube are placed 2.19 grams of 4,6-dimethyl-m-phenylenediamine and 5.31 grams of diphenyl sebacate. The tube is alternately evacuated and flushed with nitrogen to remove traces of air, and finally evacuated and sealed. The tube and its contents are heated to a temperature of 285° C. for 1¾ hours. After cooling, the tube is opened and the resulting poly(4,6-dimethyl-m-phenylene sebacamide) is found to exhibit an inherent viscosity of 0.77.

*Example II*

A solution comprising 1.94 grams of 4,6-diisopropyl-m-phenylenediamine (prepared by the platinum-catalyzed room temperature hydrogenation of 1,3-dinitro-4,6-diisopropylbenzene in isopropanol solution) and 2.23 grams of triethyl amine in 75 ml. of chloroform is placed in a Waring Blendor. A solution of 2.39 grams of sebacyl chloride in 20 ml. of chloroform is added rapidly, and the reaction mixture becomes turbid immediately. Stirring is continued for 2 minutes, at which time 100 ml. of water are added. The polymeric product is precipitated by addition of hexane, removed by filtration, washed, and dried. The resulting poly(4,6-diisopropyl-m-phenylene sebacamide) exhibits a melting point of 275° C. This is 46° higher than the observed melting point of 229° C. for poly(m-phenylene sebacamide), the corresponding polyamide which bears no nuclear substituents.

*Example III*

A solution comprising 7.59 grams of 2,4,6-trimethyl-m-phenylenediamine, 11.12 grams of triethyl amine, and 225 ml. of chloroform is prepared. While stirring the solution, sebacyl chloride, in the amount of 11.95 grams, dissolved in 100 ml. of chloroform, is added as rapidly as possible. Before all of the sebacyl chloride solution has been added, the reaction mixture becomes too viscous to be stirred easily, but continued slow stirring fluidizes the mass. Stirring is continued for 5 minutes, at which time 150 ml. of water are added. The viscosity of the solution decreases as hexane, in the amount of 700 ml., is added. The resulting polymer was removed by filtration, washed, and dried. The melting point of poly(2,4,6-trimethyl-m-phenylene sebacamide) is found to be 347° C. Inasmuch as poly(m-phenylene sebacamide) melts at 229° C., the enhancement attributable to the presence of the three nuclear methyl groups is 118° C.

*Example IV*

A solution of 1.66 grams of 2,4,5,6-tetramethyl-m-phenylenediamine and 2.23 grams of triethyl amine in 75 ml. of chloroform is stirred during the addition thereto of 2.39 grams of sebacyl chloride in 25 ml. of chloroform. The reaction mixture becomes turbid almost immediately, and stirring is continued for 5 minutes. 100 ml. of water are added while stirring is continued, and the polymer is precipitated by the addition of hexane. Poly(2,4,5,6 - tetramethyl - m - phenylene sebacamide) is separated by filtration, washed, and dried. Its melting point is in excess of 340° C., while the corresponding polyamide which bears no nuclear substituent, i.e., poly-(m-phenylene sebacamide), exhibits a melting point of 229° C.

*Example V*

In 280 ml. of chloroform are dissolved 4.55 grams of 2,4,6-trimethyl-m-phenylenediamine and 6.68 grams of triethyl amine. To this solution are added, while stirring, 5.48 grams of adipyl chloride in 100 ml. of chloroform. Only slight turbidity is noted, and stirring is continued for 3 minutes. The addition of 150 ml. of water produces a creamy emulsion. The polymer is precipitated by the addition of 500 ml. of hexane, and is separated by filtration, washed, and dried. The resulting poly(2,4,6-trimethyl-m-phenylene adipamide) exhibits a melting point of greater than 395° C. The corresponding polyamide which bears no nuclear substituents, i.e., poly(m-phenylene adipamide), melts at 344° C.

*Example VI*

Having been purified by sublimation, 4.92 grams of 2,3,5,6-tetramethyl-p-phenylenediamine are dissolved in 150 ml. of methylene chloride and 6.07 grams of triethyl amine are added. The solution is stirred vigorously during the rapid addition of a solution of 7.17 grams of sebacyl chloride in 150 ml. of methylene chloride. The resulting polymer precipitates at once in a finely divided form. The dispersion is stirred for 10 minutes and 500 ml. of distilled water are added. The polymer is isolated, washed, and dried, and found to exhibit a melting point of 419° C. Poly(p-phenylene sebacamide), the corresponding polyamide which bears no nuclear substituents, melts at 346° C.

*Example VII*

In 15 ml. of hexamethyl phosphoramide are dissolved 1.22 grams of 2-methyl-m-phenylenediamine, and the resulting solution is stirred while cooled in ice water. Stirring and cooling are continued during the addition of 2.14 ml. of sebacyl chloride over a period of about 2 minutes. After 30 minutes, the solution becomes viscous, and stirring is continued for an additional hour. The product is isolated by pouring the solution into water with stirring. Following washing, and drying, the resulting poly(2-methyl-m-phenylene sebacamide) exhibits a melting point of 300° C. The corresponding polyamide which bears no nuclear substituents melts at 228° C. Films of the polymer of this example may be cast from solution in N-methyl pyrrolidone containing 5% lithium chloride. White, flexible films are thus produced.

*Example VIII*

To 15 ml. of hexamethyl phosphoramide are added 2.11 grams of 2,4,6-trichloro-m-phenylenediamine, and solution is effected by stirring while cooling in an ice bath. Stirring of the cooled solution is continued during the slow addition of 2.14 ml. (0.10 mole) of sebacyl chloride over a period of about 2 minutes. After 30 minutes, the solution has become viscous, and its viscosity is not appreciably increased by continuing the stirring for an additional hour. The polymer is isolated by pouring the reaction mixture into water and filtering. Following washing and drying, poly(2,4,6-trichloro-m-phenylene sebacamide) exhibits a polymer melt temperature of 285° C. The corresponding polyamide which bears no nuclear substituents, i.e., poly(m-phenylene sebacamide), melts at 228° C.

The polyamides of this invention are useful in the form of shaped structures of various kinds. Particularly valuable are films and filaments formed from these polymers, which have melting points of at least 40° C. higher than the corresponding polyamides which bear no substituents on the Ar nucleus. Because of their enhanced melting points and their resistance to degradation at elevated temperatures, they may be employed in many applications which involve these higher temperatures. For example, fabrics made from filaments of these polyamides are useful as press cloths in commercial and home laundering; in protective clothing; in high temperature insulation; and in filtration media, to name only a few of the possible fields of utility. In addition, the excellent thermal characteristics of these polyamides provide fine wash and wear fabrics which are useful in numerous products.

I claim:

1. A high melting polyamide consisting essentially of repeating units having the following structural formula

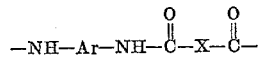

in which Ar is selected from the group consisting of

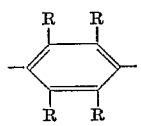

and

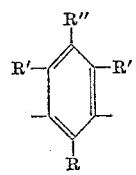

wherein R and R' are selected from the group consisting of methyl, ethyl, and halogen; R" is selected from the group consisting of hydrogen, methyl, ethyl, and halogen and X is $(CH_2)_n$ where $n$ is a number from 0–8.

2. The polyamide of claim 1 wherein Ar has the structural formula:

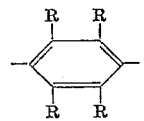

and wherein R is selected from the group consisting of methyl, ethyl, and halogen.

3. The polyamide of claim 1 wherein Ar has the structural formula:

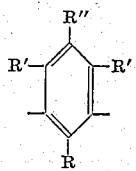

and wherein R and R' are selected from the group consisting of methyl, ethyl, and halogen, and R" is selected from the group consisting of hydrogen, methyl, ethyl and halogen.

References Cited by the Examiner

UNITED STATES PATENTS

| 2,244,192 | 6/41 | Flory | 260—78 |
| 2,907,754 | 10/59 | Howlett et al. | 260—78 |
| 3,006,899 | 10/61 | Hill et al. | 260—78 |

FOREIGN PATENTS

| 461,237 | 2/37 | Great Britain. |
| 525,516 | 8/40 | Great Britain. |

WILLIAM H. SHORT, *Primary Examiner.*

M. STERMAN, H. N. BURSTEIN, *Examiners.*